United States Patent [19]

Leininger

[11] 4,377,651

[45] Mar. 22, 1983

[54] POLYOLEFIN STABILIZATION

[75] Inventor: James C. Leininger, Greenville, S.C.

[73] Assignee: Phillips Petroleum Company, Bartlesville, Okla.

[21] Appl. No.: 254,680

[22] Filed: Apr. 16, 1981

Related U.S. Application Data

[63] Continuation of Ser. No. 82,391, Oct. 5, 1979, abandoned.

[51] Int. Cl.$^3$ ............................................. C08K 5/34
[52] U.S. Cl. .............................. 524/101; 252/400 A; 524/102; 524/120
[58] Field of Search ............... 260/45.8 NP, 45.75 N; 524/102, 101, 120; 252/400 A, 405

[56] References Cited

U.S. PATENT DOCUMENTS

| | | | |
|---|---|---|---|
| 3,824,192 | 7/1974 | Di Battista et al. | 260/45.95 D |
| 3,904,581 | 9/1975 | Murayama et al. | 260/45.8 |
| 3,993,655 | 11/1976 | Rasberger et al. | 260/293.64 |
| 4,035,323 | 7/1977 | Mathis | 260/23 XA |
| 4,046,737 | 9/1977 | Holt et al. | 260/45.8 N |
| 4,052,351 | 10/1977 | Dix et al. | 260/23 H |
| 4,076,689 | 2/1978 | Mills | 260/45.75 N |
| 4,110,305 | 8/1978 | Holt et al. | 524/102 |
| 4,185,003 | 1/1980 | Hoeschele | 524/102 |
| 4,198,334 | 4/1980 | Rasberger | 524/102 |

OTHER PUBLICATIONS

Polymer Preprints–vol. 18, No. 1, Mar. 1977, pp. 393–401–Div. of Polymer Chemistry Inc., ACS.
Journal of Applied Polymer Science–vol. 22, 2217–2228 (1978).

*Primary Examiner*—Veronica P. Hoke

[57] ABSTRACT

Homopolymers and copolymers of 1-olefins are protected against the deleterious effects of oxygen, heat and ultraviolet light by incorporating therein an additive system comprising a hindered amine component and a metal phosphonate component, optionally, containing a phenolic antioxidant, an organic phosphite, a lubricant and pigments in an amount sufficient to prevent such deterioration.

20 Claims, No Drawings

POLYOLEFIN STABILIZATION

This application is a continuation application of my copending application, Ser. No. 82,391, filed Oct. 5, 1979, now abandoned.

BACKGROUND OF THE INVENTION

This invention relates to polyolefin stabilization. In accordance with another aspect, this invention relates to the stabilization of 1-olefin polymers by the incorporation of a stabilizing system comprising a hindered amine component and a metal phosphonate component. In accordance with another aspect, this invention relates to stabilized olefin polymers containing a stabilizing system comprising a hindered amine component and a metal phosphonate component, optionally, containing a phenolic antioxidant, an organic phosphite, a lubricant and pigments. In accordance with a further aspect, this invention relates to articles produced from polyolefins that are protected from the deleterious effects of oxygen, heat and UV light by admixture with a minor amount of the stabilizing system of this invention. In accordance with a further aspect, this invention relates to a stabilizer system for olefin polymers comprising a mixture of a hindered amine component and a metal phosphonate component.

The importance of protecting 1-olefin polymers against the degradative effects of oxygen, heat and sunlight is well-known. Numerous additives have been found to be effective, to varying degrees, for certain polymer compositions to provide this protection.

Accordingly, an object of this invention is to provide an oxygen, heat and ultraviolet light stabilizing system for polyolefins.

It is another object of this invention to provide polyolefins stabilized against the degradative effect of ultraviolet light.

Other objects, aspects and the several advantages of this invention will become apparent to one skilled in the art upon the study of this disclosure and the appended claims.

STATEMENT OF THE INVENTION

In accordance with the present invention, there is provided a polyolefin composition stabilized against the effects of oxygen, heat and ultraviolet light degradation comprising a normally solid polymer of an aliphatic 1-olefin having incorporated therein a stabilizing amount of a stabilizer system comprising a hindered amine component and a metal phosphonate component.

In accordance with another embodiment of the invention, polyolefins, such as polymers of propylene, are stabilized against the deleterious effects of oxygen, heat and UV light by admixture with a minor amount of the stabilizing system of the invention which, optionally, contains a phenolic antioxidant, an organic phosphite, a lubricant, e.g., calcium stearate, and a pigment.

In accordance with another embodiment of the invention, articles such as fibers, film, injection molded objects, blow molded objects, and the like, produced from polyolefins are protected from the deleterious effects of oxygen, heat and UV light by admixture with a minor amount of the stabilizing system of this invention.

DETAILED DESCRIPTION

The term "polyolefin" as used herein is intended to include the normally solid homopolymers and co- and terpolymers of aliphatic 1-olefins having from 2 to about 10 carbon atoms per molecule and blends thereof. Specific examples include polyethylene, polypropylene, poly(1-butene), copolymers of ethylene/propylene, ethylene1-hexene, ethylene/1-decene, propylene/ethylene, propylene/ethylene/1-butene, and the like. Presently preferred polymers include polypropylene and propylene/1-olefin copolymers containing at least about 90 mole % propylene and from about 0.1 to about 10 mole % of a 1-olefin comonomer, particularly ethylene, Processes for preparing the polymers are well-known, e.g. U.S. Pat. No. 2,825,725 which issued Mar. 26, 1956, to Hogan et al and U.S. Pat. No. 3,502,632 which issued Mar. 24, 1970, to Stedefeder et al.

The hindered amine component can be shown by the formula

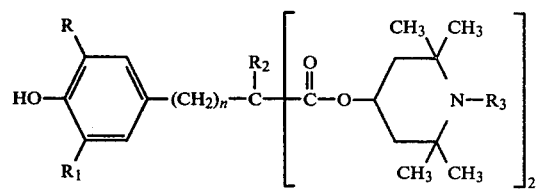

where R, $R_1$, $R_2$ are the same or different and each is an alkyl group having from 1 to 6 carbon atoms such as methyl, n-propyl, n-butyl, t-butyl, t-pentyl, t-hexyl, $R_3$ is an alkyl group having from 1 to 12 carbon atoms, and n is an integer of 1 to 4.

Specific hindered amine compounds that can be used according to the invention include:
di-(1,2,2,6,6-pentamethyl-4-piperidyl)-2-n-butyl-2-(4-hydroxy-3,5-di-t-butylbenzyl)malonate, presently, preferred
di-(1-dodecyl-2,2,6,6-tetramethyl-4-piperidyl)-2-methyl-2-(4-hydroxy-3,5-di-t-hexylbenzyl)malonate, and
di-(1-n-propyl-2,2,6,6,-tetramethyl-4-piperidyl)-2-ethyl-2-(4-hydroxy-3,5-di-t-butylphenylpropyl)malonate
and the like, and mixtures thereof.

The metal phosphonate can be shown by the formula:

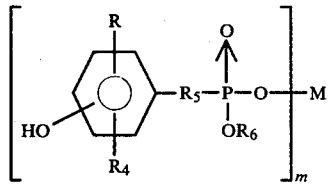

where R is as before, $R_4$ is hydrogen or alkyl having from 1 to 6 carbon atoms, $R_5$ is an alkylene radical having from 1 to 4 carbon atoms, $R_6$ is hydrogen or alkyl having from 1 to 30 carbon atoms, M is a metal selected from among aluminum, barium, cadmium, calcium, chromium, cobalt, nickel, sodium, tin, and zinc and m is 1, 2 or 3. Of the metals, nickel and calcium are presently preferred.

Specific metal phosphonate compounds that can be used according to the invention include: nickel bis(O-ethyl-3,5,-di-t-butyl-4-hydroxybenzylphosphonate), cobalt bis(O-n-octadecyl-3,5-di-t-hexyl-4-hydroxybenzylphosphonate), barium bis[O-triacontyl(3,5-di-t-pentyl-4-hydroxyphenyl)propylphosphonate], calcium bis[O-methyl(3,5-di-t-butyl-4-hydroxybenzyl)butylphosphonate], aluminum tris(O-n-butyl-3,5-di-t-butyl-4-hydroxybenzylphosphonate), sodium [O-dodecyl-(3-t-butyl-4-hydroxyphenyl)ethylphosphonate], zinc 3,5-di-t-butyl-4-hydroxybenzylphosphonate, chromium tris(O-n-hexyl-3,5-di-t-butyl-4-hydroxybenzylphosphonate), cadmium bis(O-octadecyl-3-methyl-4-hydroxy-5-t-butylbenzylphosphonate), and tin bis(O-n-butyl-3,5-di-t-butyl-4-hydroxybenzylphosphonate), and the like, and mixtures thereof.

In a presently preferred embodiment, the stabilized compositions of this invention are also admixed with a phenolic heat stabilizer, a colorant(s), and optionally, an organic phosphite.

The phenolic heat stabilizer that can be used according to the invention is preferably a hydroxyphenylalkenyl isocyanurate such as tris-(3,5-di-t-butyl-4-hydroxybenzyl)isocyanurate. The isocyanurates are more fully described in U.S. Pat. No. 3,531,483 which issued Sept. 29, 1970 to J. C. Gilles. However, other conventional heat stabilizers such as 2,6-di-t-butyl-4-methylphenol (BHT), n-octadecyl[3-(3,5-di-t-butyl-4-hydroxybenzyl)]propionate, di-n-octadecyl(3,5-di-t-butyl-4-hydroxybenzyl) phosphonate, tetrakis[methylene(3,5-di-t-butyl-4-hydroxyhydrocinnamate)]methane, and 2,4,6-tris(3,5-di-t-butyl-4-hydroxybensyl)benzene, and the like, and mixtures thereof, can also be employed.

The organic phosphites contemplated, when used include aryl phosphites such as tris(nonylphenyl)phosphite, tris(2,4-di-t-butylphenyl) phosphite, alkyl phosphites such as trioctyl phosphite, dilauryl phosphite, and the like. More preferably, the organic phosphite is a diphosphite such as the pentaerythritol derivatives disclosed in U.S. Pat. Nos. 3,047,608 which issued July 31, 1962, to Friedman et al and 3,053,873 which issued Sept. 11, 1962, to Friedman et al. A particularly preferred compound is 3,9-di(octadecyloxy)-2,4,8,10-tetraoxa-3,9-diphosphaspiro[5,5]undecane, more commonly known as distearly pentaerythritol diphosphite.

Suitable colorants for use in the inventive compositions are those having sufficient thermal stability to be conventionally employed with polyolefins and can be of inorganic or organic nature. Mixtures can be used. Such colorants are commercially available in powder and concentrate form and can include, for example, titanium dioxide, carbon black, cadmium sulfide, phthalocyanine green, ultramarine blue, chelating dyestuffs including those described in U.S. Pat. No. 3,357,783 which issued Dec. 12, 1967, to Wunderlich et al, and the like.

Other suitable additives can be included in the formulations of the invention providing the improved results of this invention are not adversely affected. These additives include fillers, antistatic agents, lubricating or processing agents such as calcium stearate, and the like.

Each stabilizer component is used in a small but effective amount sufficient to provide the desired degree of stabilization. The hindered amine component and the metal phosphonate component each can be employed in an amount ranging from about 0.05 to about 5 wt. % based on the weight of the total composition, preferably from about 0.05 to about 2 wt. %. The weight ratio of these components, amine/phosphonate generally lies in the range from about 0.1:1 to about 10:1.

The amounts of each of the heat stabilizer and processing aids, when employed, can range from about 0.01 to about 1 wt. %, preferably from about 0.05 to about 0.5 wt. %.

The amount of organic phosphite, when employed, can range from about 0.02 to about 1 php, preferably from about 0.05 to about 0.2 php.

The amount of colorant(s), when employed, can range from about 0.0005 to about 5 wt. % so as to provide the desired shade of color required.

The stabilizing systems of the present invention can be incorporated into the polymer in any conventional manner such as by dry blending the additive system directly with polymer pellets or fluff by means of tumble mixers, Henschel blenders, and the like. Solutions or slurries of the stabilizers can be sprayed onto or admixed with a granular polymer. Stabilizers can also be blended with a molten polymer by means of a Banbury mixer, Brabender mixer, roll mill, screw extruder, and the like.

EXAMPLE 1

A series of compositions was prepared by admixing the stated quantities of the specified hindered amine, when employed, specified nickel phosphonate, when employed, and 0.1 wt. % tris (2,4-di-t-butylphenyl) phosphite with a commercially available polypropylene having a nominal melt flow of 12 as determined by ASTM D 1238-65T, condition L, and a melting point of about 170° C. Each blend was initially mixed together in a Henschel blender by combining the additive(s) with the polypropylene powder (fluff). The resulting blend was extruded at about 245° C. into strands and pelletized. The resulting pellets were then reextruded and repelletized as before to produce each final composition. The compositions were then melt spun at about 260° C. into an eight strand multifilament. Four such strands were plied together and drawn 5X at about 135° C. to produce a 17 denier per filament yarn. The yarn was then knitted into a sleeve about 5 cm in diameter from which samples of convenient lengths for test purposes were later cut.

The UV stability of the samples was determined in a [GMC] twin carbon arc Weatherometer at a black panel temperature averaging about 88° C. Periodic water spraying also occurs in this test. Each sample was mounted on a black backed Altas mounting fadeometer card. Each sample was periodically examined for degradation, usually about every 20 hours. Degradation (time to failure) was arbitrarily taken as the number of exposure hours required to weaken the fabric so that it was observed to flake when gently scratched with a finger nail or plastic needle.

The quantity and nature of each stabilizer employed and the results obtained are given in Table 1.

TABLE 1

| | | | | Degradation Results | | |
|---|---|---|---|---|---|---|
| Run No. | Hindered Amine (A) Wt. Percent | Nickel Phosphonate (B) Wt. Percent | Weight Ratio A:B | Hours to Failure Actual | Expected (C) | Improvement % |
| 1 | 0 | 0 | — | 80 | — (D) | — |
| 2 | 0.2 | 0 | — | 240 | — | — |

TABLE 1-continued

| Run No. | Hindered Amine (A) Wt. Percent | Nickel Phosphonate (B) Wt. Percent | Weight Ratio A:B | Degradation Results Hours to Failure Actual | Expected (C) | Improvement % |
|---|---|---|---|---|---|---|
| 3 | 0.4 | 0 | — | 260 | — | — |
| 4 | 0.6 | 0 | — | 340 | — | — |
| 5 | 0 | 0.2 | — | 160 | — | — |
| 6 | 0 | 0.4 | — | 360 | — | — |
| 7 | 0 | 0.6 | — | 440 | — | — |
| 8 | 0.2 | 0.2 | 1:1 | 540 | 320 | 69 |
| 9 | 0.2 | 0.4 | 0.5:1 | 640 | 520 | 23 |
| 10 | 0.2 | 0.6 | 0.3:1 | 780 | 600 | 30 |
| 11 | 0.4 | 0.2 | 2:1 | 780 | 340 | 129 |
| 12 | 0.4 | 0.4 | 1:1 | 840 | 540 | 56 |
| 13 | 0.4 | 0.6 | 0.67:1 | 920 | 620 | 48 |
| 14 | 0.6 | 0.2 | 3:1 | 900 | 420 | 114 |
| 15 | 0.6 | 0.4 | 1.5:1 | 1220 | 620 | 97 |
| | | | | | average | 71 |

(A) di-(1,2,2,6,6-pentamethyl-4-piperidyl)-2-n-butyl-2-(4-hydroxy-3,5-di-t-butylbenzyl) malonate.
(B) nickel bis(O—ethoxy-3,5-di-t-butyl-4-hydroxybenzyl phosphonate)
(C) Expected hous are calculated by adding hours to time of failure of control fiber (80 hours) plus time to failure of appropriate sample containing hindered amine less 80 hours plus time to failure of appropriate sample containing nickel phosphonate less 80 hours.
(D) A dash signifies no entry is needed.

Examination of the data given in Table 1 shows that the total amount of the stabilizer mixtures employed varied from 0.4 to 1.0 wt. % based on the total weight of the compositions and that the weight ratio of hindred amine to nickel phosphonate varies from 0.3:1 to 3:1. In these ranges, the test results clearly show that the actual hours to failure (degradation) are substantially greater than the predicted hours to failure based on the additive effect of each stabilizer alone. This is particularly evident at weight ratios of 1:1 or higher.

EXAMPLE 2

Following the procedure described in the first example, a series of compositions was prepared by mixing individual portions of the 12 melt flow polypropylene fluff with a specified amount of the hindered amine, when employed, with a specified amount of the nickel phosphonate, when employed, with 0.1 wt. % of distearyl pentaerythritol diphosphite, with 0.08 wt. % of tris-(3,5-di-t-butyl-4-hydroxybenzyl)isocyanurate, and with an amount of a color concentrate containing Pigment Red 194 (Color Index 71100) sufficient to provide about 1 wt. % pigment in the final composition.

Each composition was formed into knitted sleeves, cut into lengths, and tested for UV stability in the twin carbon arc weatherometer as before.

A curve was constructed from the results obtained with the series 20 compositions (hindered amine, no nickel phosphonate) and a curve was constructed from the results obtained with the series 30 compositions (nickel phosphonate, no hindered amine).

With the remaining compositions containing varying amounts of both hindered amine and nickel phosphonate, the expected contribution of each is determined by consulting the appropriate curve, summing the results, and subtracting 80 hours to get the expected time to failure for that particular combination. A composition containing neither hindered amine nor nickel phosphonate has a time to degradation of about 80 hours in the test employed. In calculating the expected time to degradation of an invention composition, the expected time to degradation of a control containing either hindered amine (no phosphonate) or nickel phosphonate (no hindered amine) is determined by inspection of the proper curve and 80 hours is subtracted from the summed results so that the basic 80 hours is counted only once. The final result thus gives the expected (predicted) time to failure for that particular combination.

The quantities of the stabilizers employed and the results obtained are given in Table 2.

TABLE 2

Degradation Results, Red Samples

| | Stabilizer[a] | | Composition A | | | | Composition B | | | | Composition C | | | |
|---|---|---|---|---|---|---|---|---|---|---|---|---|---|---|
| Series | Component | Wt.[c] Ratio | Stab. Wt. % | Hours to Failure Actual | Expected | Impr. % | Stab. Wt. % | Hours to Failure Actual | Expected | Impr. % | Stab. Wt. % | Hours to Failure Actual | Expected | Impr. % |
| 20 | HA | 1 | 0.17 | | | | 0.34 | | | | 0.51 | | | |
| | NF | 0 | 0 | 500 | —[b] | — | 0 | 740 | — | — | 0 | 940 | — | — |
| 30 | HA | 0 | 0 | | | | 0 | | | | 0 | | | |
| | NF | 1 | 0.33 | 160 | — | — | 0.66 | 180 | — | — | 0.99 | 340 | — | — |
| 40 | HA | 4 | 0.16 | | | | 0.30 | | | | 0.45 | | | |
| | NF | 1 | 0.04 | 540 | 480 | 12 | 0.08 | 820 | 700 | 17 | 0.11 | 920 | 885 | 3.9 |
| 50 | HA | 3 | 0.15 | | | | 0.29 | | | | 0.44 | | | |
| | NF | 1 | 0.05 | 540 | 470 | 15 | 0.10 | 880 | 690 | 27 | 0.15 | 940 | 885 | 6.2 |
| 60 | HA | 2 | 0.14 | | | | 0.27 | | | | 0.41 | | | |
| | NF | 1 | 0.07 | 400 | 455 | −12 | 0.14 | 820 | 690 | 19 | 0.20 | 1080 | 870 | 24 |
| 78 | HA | 1 | 0.11 | | | | 0.22 | | | | 0.34 | | | |
| | NF | 1 | 0.11 | 480 | 405 | 48 | 0.22 | 720 | 625 | 15 | 0.34 | 880 | 820 | 7.3 |
| 80 | HA | 0.5 | 0.08 | | | | 0.17 | | | | 0.25 | | | |
| | NF | 1 | 0.17 | 540 | 365 | 19 | 0.33 | 460 | 580 | −21 | 0.50 | 880 | 755 | 17 |

TABLE 2-continued

| | | | | | | | | | | | | | | | |
|---|---|---|---|---|---|---|---|---|---|---|---|---|---|---|---|
| | | | | Degradation Results, Red Samples | | | | | | | | | | | |
| 90 | HA | 0.3 | 0.07 | | | | 0.13 | | | | 0.20 | | | | |
| | NF | 1 | 0.20 | 260 | 350 | −26 | 0.40 | 480 | 530 | −9.4 | 0.60 | 700 | 705 | −0.7 | |
| 100 | HA | 0.25 | 0.06 | | | | 0.11 | | | | 0.17 | | | | |
| | NF | 1 | 0.22 | 180 | 335 | −46 | 0.45 | 380 | 500 | −24 | 0.67 | 680 | 690 | −1.4 | |

| | | | | Composition | | | | | | |
|---|---|---|---|---|---|---|---|---|---|---|
| | | Stabilizer[a] | | D | | | | E | | |
| | | | Wt.[c] | Stab. Wt. | Hours to Failure | | Impr. | Stab. Wt. | Hours to Failure | Impr. |
| Series | Component | | Ratio | % | Actual | Expected | % | % | Actual | Expected | % |
| 20 | HA | | 1 | 0.68 | | | | 0.85 | | | |
| | NF | | 0 | 0 | 1080 | — | — | 0 | 1000 | — | — |
| 30 | HA | | 0 | 0 | | | | 0 | | | |
| | NF | | 1 | 1.32 | 440 | — | — | 1.65 | 540 | — | — |
| 40 | HA | | 4 | 0.60 | | | | 0.75 | | | |
| | NF | | 1 | 0.15 | 1100 | 1045 | 5.3 | 0.19 | 1220 | 1080 | 13 |
| 50 | HA | | 3 | 0.58 | | | | 0.73 | | | |
| | NF | | 1 | 0.19 | 1160 | 1035 | 12 | 0.24 | 1320 | 1120 | 18 |
| 60 | HA | | 2 | 0.54 | | | | 0.68 | | | |
| | NF | | 1 | 0.27 | 1140 | 1020 | 12 | 0.34 | 1340 | 1160 | 16 |
| 78 | HA | | 1 | 0.45 | | | | 0.56 | | | |
| | NF | | 1 | 0.45 | 1180 | 975 | 21 | 0.56 | 1320 | 1120 | 18 |
| 80 | HA | | 0.5 | 0.34 | | | | 0.42 | | | |
| | NF | | 1 | 0.67 | 1040 | 910 | 14 | 0.84 | 1100 | 1060 | 3.8 |
| 90 | HA | | 0.3 | 0.27 | | | | 0.34 | | | |
| | NF | | 1 | 0.81 | 880 | 875 | 0.6 | 1.01 | 1100 | 1010 | 8.9 |
| 100 | HA | | 0.25 | 0.22 | | | | 0.28 | | | |
| | NF | | 1 | 0.89 | 760 | 815 | −6.7 | 1.11 | 1400 | 965 | 45 |

[a]HA is hindered amine, di-(1,2,2,6,6-pentamethyl-4-piperidyl)-2-n-butyl-2(4-hydroxy-3,5-di-t-butylbenzyl) malonate. NF is nickel phosphonate, nickel bis (O—ethoxy-3,5-di-t-butyl-4-hydroxybenzyl phosphonate).
[b]A dash signifies no entry required. These are control runs.
[c]HA/NF weight ratio.

Inspection of the results of Table 2 reveals that the fibers containing the hindered amine and nickel phosphonate in combination with the red pigment, the organic phosphite and the substituted isocyanurate antioxidant generally exhibit good resistance to UV light. Some of the fibers exhibit outstanding resistance, particularly those where the hindered amine/nickel phosphonate weight ratio varies from about 0.5:1 to about 4:1 and the concentration of both stabilizers ranges from about 0.2 wt. % to about 1.2 wt. %. Some of the values obtained, particularly those of series 60, Composition A, and series 80, Composition B, appear too low and out of line with the other results. This is believed to reflect possible errors in compounding the samples thus giving samples lower in stabilizer content than specified.

EXAMPLE 3

A series of compositions similar to those of the second example except that an amount of a color concentrate containing Pigment Blue 15 (Color Index 74160) sufficient to provide about 1 wt. % pigment in the final composition was used as the colorant in place of the red pigment.

As before, each composition was converted into knitted sleeves and tested for UV stability in the twin carbon arc weatherometer.

Curves were constructed as described before for the degradation results obtained for the control runs, e.g., Series 110 and 120 compositions. Based on the curves and the actual test results obtained, the improvement in degradation resistance for the invention compositions was determined as well as the expected values.

The quantities of stabilizers employed and the results obtained are presented in Table 3.

TABLE 3

| | | | | | | Composition | | | | | | | |
|---|---|---|---|---|---|---|---|---|---|---|---|---|---|
| | | | | F | | | G | | | | H | | |
| | Stabilizer[a] | | Stab. | Hour to Failure | | | Stab. | Hours to Failure | | | Stab. | Hours to Failure | |
| | | Wt.[c] | Wt. | | | Impr. | Wt. | | | Impr. | Wt. | | | Impr. |
| Series | Component | Ratio | % | Actual | Expected | % | % | Actual | Expected | % | % | Actual | Expected | % |
| 110 | HA | 1 | 0.17 | | | | 0.34 | | | | 0.51 | | | |
| | NF | 0 | 0 | 360 | —[b] | — | 0 | 660 | — | — | 0 | 800 | — | — |
| 120 | HA | 0 | 0 | | | | 0 | | | | 0 | | | |
| | NF | 1 | 0.33 | 480 | — | — | 0.66 | 860 | — | — | 0.99 | 920 | — | — |
| 130 | HA | 4 | 0.16 | | | | 0.30 | | | | 0.45 | | | |
| | NF | 1 | 0.04 | 400 | 410 | −2.4 | 0.08 | 780 | 670 | 16 | 0.11 | 1100 | 890 | 24 |
| 140 | HA | 3 | 0.15 | | | | 0.29 | | | | 0.44 | | | |
| | NF | 1 | 0.05 | 460 | 410 | 12 | 0.10 | 880 | 680 | 29 | 0.15 | 1140 | 930 | 23 |
| 150 | HA | 2 | 0.14 | | | | 0.27 | | | | 0.41 | | | |
| | NF | 1 | 0.07 | 400 | 410 | −2.4 | 0.14 | 1020 | 700 | 46 | 0.20 | 1220 | 960 | 27 |
| 160 | HA | 1 | 0.11 | | | | 0.22 | | | | 0.34 | | | |
| | NF | 1 | 0.11 | 600 | 410 | 46 | 0.22 | 1200 | 720 | 67 | 0.34 | 1380 | 1030 | 34 |
| 170 | HA | 0.5 | 0.08 | | | | 0.17 | | | | 0.25 | | | |

TABLE 3-continued

| | | | | | Degradation Results, Blue Samples | | | | | | | | |
|---|---|---|---|---|---|---|---|---|---|---|---|---|---|
| 180 | NF | 1 | 0.17 | 580 | 430 | 35 | 0.33 | 1180 | 770 | 53 | 0.50 | 1320 | 1040 | 27 |
| | HA | 0.3 | 0.07 | | | | 0.13 | | | | 0.20 | | | |
| 190 | NF | 1 | 0.20 | 520 | 450 | 16 | 0.40 | 1000 | 760 | 32 | 0.60 | 1320 | 1040 | 27 |
| | HA | 0.25 | 0.06 | | | | 0.11 | | | | 0.17 | | | |
| | NF | 1 | 0.22 | 740 | 460 | 61 | 0.45 | 860 | 770 | 12 | 0.67 | 1160 | 1050 | 10 |
| Average Improvement, % | | | | | | 52 | | | | 55 | | | | 40 |

| | | | Composition | | | | | | |
|---|---|---|---|---|---|---|---|---|---|
| | | | | I | | | | J | |
| | Stabilizer[a] | | Stab. | Hours to Failure | | | Stab. | Hours to Failure | |
| Series | Component | Wt.[c] Ratio | Wt. % | Actual | Expected | Impr. % | Wt. % | Actual | Expected | Impr. % |
|---|---|---|---|---|---|---|---|---|---|---|
| 110 | HA | 1 | 0.68 | | | | 0.85 | | | |
| | NF | 0 | 0 | 900 | — | — | 0 | 1040 | — | — |
| 120 | HA | 0 | 0 | | | | 0 | | | |
| | NF | 1 | 1.32 | 1020 | — | — | 1.65 | 1140 | — | — |
| 130 | HA | 4 | 0.60 | | | | 0.75 | | | |
| | NF | 1 | 0.15 | 1140 | 1080 | 5.6 | 0.19 | 1480 | 1220 | 21 |
| 140 | HA | 3 | 0.58 | | | | 0.73 | | | |
| | NF | 1 | 0.19 | 1120 | 1100 | 1.8 | 0.24 | 1440 | 1270 | 13 |
| 150 | HA | 2 | 0.54 | | | | 0.68 | | | |
| | NF | 1 | 0.27 | 1440 | 1160 | 24 | 0.34 | 1460 | 1350 | 8.1 |
| 160 | HA | 1 | 0.45 | | | | 0.56 | | | |
| | NF | 1 | 0.45 | 1660 | 1250 | 33 | 0.56 | 1860 | 1450 | 28 |
| 170 | HA | 0.5 | 0.34 | | | | 0.42 | | | |
| | NF | 1 | 0.67 | 1960 | 1300 | 51 | 0.84 | 1800 | 1510 | 19 |
| 180 | HA | 0.3 | 0.27 | | | | 0.34 | | | |
| | NF | 1 | 0.81 | 1700 | 1300 | 31 | 1.01 | 1900 | 1500 | 27 |
| 190 | HA | 0.25 | 0.22 | | | | 0.28 | | | |
| | NF | 1 | 0.89 | 1400 | 1270 | 10 | 1.11 | 1780 | 1600 | 11 |
| Average Improvement, % | | | | | | 31 | | | | 26 |

[a]HA is hindered amine, di-(1,2,2,6,6-pentamethyl-4-piperidyl)-2-n-butyl-2(4-hydroxy-3,5-di-t-butylbenzyl) malonate. NF is nickel phosphonate, nickel bis(O—ethoxy-3,5-di-t-butyl-4-hydroxybenzyl phosphonate).
[b]A dash signifies no entry needed. These are control runs.
[c]HA/NF weight ratio.

Examination of the results of Table 3 shows that the fibers containing the hindered amine and nickel phosphonate in combination with the blue pigment, the organic phosphite and the substituted isocyanurate antioxidant also generally exhibit good resistance to UV light. In fact, better results are obtained in the presence of this pigment than in the presence of the red pigment. With the blue pigment, the weight ratio of hindered amine to nickel phosphonate, can vary from at least 0.25:1 to at least 4:1 and the concentration of the two stabilizers can range from about 0.2 wt. % to about 1.2 wt. %. Some anomolous results were obtained as before, particularly those in Series 130, Composition F, Series 140 Composition I, and Series 150, Composition F. As stated before, such results are believed to result from possible compounding errors in preparing the compositions.

In summation, the specific examples show that the hindered amine/metal phosphonate stabilizing system is effective in natural and in colored compositions to provide unexpected resistance to UV light compared to either stabilizer alone at comparable concentrations. When a colorant is employed, optimum results can be obtained by adjusting the level of the stabilizer as required to compensate for the effect of the colorant on the system as is known in the art.

I claim:

1. A stabilized polymeric composition comprising a major amount of a polymer of a mono-1-olefin having incorporated therein a small, but effective, stabilizing amount, sufficient to stabilize said composition against the deteriorative action of oxygen, heat and ultraviolet light, of
    (a) at least one hindered amine represented by the formula

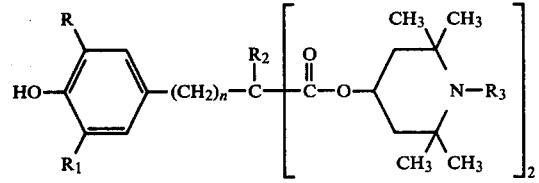

where R, $R_1$, $R_2$ are the same or different and each is an alkyl group having from 1 to 6 carbon atoms such as methyl, n-propyl, n-butyl, t-butyl, t-pentyl, t-hexyl, $R_3$ is an alkyl group having from 1 to 12 carbon atoms, and n is an integer of 1 to 4 and
    (b) at least one metal phosphonate represented by the formula

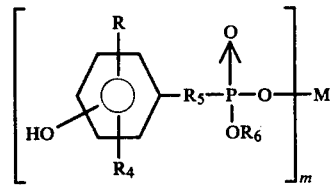

where R is as before, $R_4$ is hydrogen or alkyl having from 1 to 6 carbon atoms, $R_5$ is an alkylene radical having from 1 to 4 carbon atoms, $R_6$ is hydrogen or alkyl having from 1 to 30 carbon atoms, M is a metal selected from among aluminum, barium, cadmium, calcium, chromium, cobalt, nickel, sodium, tin, and zinc and m is 1, 2 or 3.

2. A composition according to claim 1 wherein said polymer is a polymer of propylene.

3. A composition according to claim 2 wherein said polymer is a homopolymer of propylene.

4. A composition according to claim 1 which additionally contains a small, but effective, stabilizing amount of
   (c) at least one phenolic heat stabilizer,
   (d) at least one organic phosphite, and
   (e) at least one colorant.

5. A composition according to claim 1 wherein the amounts of (a) and (b) each can be employed in an amount ranging from about 0.05 to about 5 weight percent based on the weight of the total composition and the weight ratio of (a) to (b) ranges from about 0.1:1 to about 10:1.

6. A composition according to claim 4 wherein the amount of (c) ranges from about 0.01 to about 1 weight percent, the amount of (d) ranges from about 0.02 to about 1 php, and the amount of (e) ranges from about 0.0005 to about 5 weight percent.

7. A composition according to claim 4 wherein said polymer is a polymer of propylene.

8. A composition according to claim 1 wherein (a) is di-(1,2,2,6,6-pentamethyl-4-piperidyl)-2-n-butyl-2-(4-hydroxy-3,5-di-t-butylbenzyl)malonate and (b) is nickel bis(O-ethoxy-3,5-di-t-butyl-4-hydroxybenzyl phosphonate), the amounts of (a) and (b) each can be employed in an amount ranging from about 0.05 to about 5 weight percent based on the weight of the total composition, and the weight ratio of (a) to (b) ranges from about 0.1:1 to about 10:1.

9. A composition according to claim 8 wherein said polymer is a polymer of propylene.

10. A composition according to claim 8 which additionally contains (c) tris-(3,5-di-t-butyl-4-hydroxybenzyl)cyanurate, (d) is distearyl pentaerythritol diphosphite, and (e) is a colorant.

11. A composition according to claim 10 wherein said polymer is a homopolymer of propylene.

12. A stabilized polymeric composition of claim 2 or 3 wherein said composition also comprises a blue colorant.

13. A stabilized polymeric composition of claim 4 wherein said at least one colorant is chosen from blue colorants.

14. A stabilizer polymeric composition of claim 5, 6, or 7 wherein said mono-1-olefin is propylene and said composition also comprises a blue colorant.

15. A stabilized polymeric composition of claim 9 or 11 wherein said at least one colorant is chosen from blue colorants.

16. A stabilizer system for polymers comprising a mixture of
    (a) at least one hindered amine represented by the formula

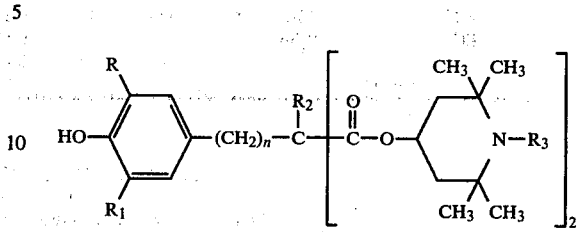

where $R$, $R_1$, $R_2$ are the same or different and each is an alkyl group having from 1 to 6 carbon atoms such as methyl, n-propyl, n-butyl, t-butyl, t-pentyl, t-hexyl, $R_3$ is an alkyl group having from 1 to 12 carbon atoms, and n is an integer of 1 to 4 and (b) at least one metal phosphonate represented by the formula

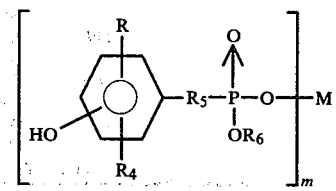

where R is as before, $R_4$ is hydrogen or alkyl having from 1 to 6 carbon atoms, $R_5$ is an alkylene radical having from 1 to 4 carbon atoms, $R_6$ is hydrogen or alkyl having from 1 to 30 carbon atoms, M is a metal selected from among aluminum, barium, cadmium, calcium, chromium, cobalt, nickel, sodium, tin, and zinc and m is 1, 2 or 3.

17. The system of claim 16 wherein the weight ratio of (a) to (b) is in the approximate range of 0.1:1 to 10:1.

18. The system of claim 16 wherein said compound (a) is di-(1,2,2,6,6-pentamethyl-4-piperidyl)-2-n-butyl-2-(4-hydroxy-3,5-di-t-butylbenzyl)malonate and said compound (b) is nickel bis(O-ethoxy-3,5-di-t-butyl-4-hydroxybenzyl phosphonate).

19. The system of claim 16 having additionally incorporated therewith
    (c) at least one phenolic heat stabilizer,
    (d) at least one organic phosphite and
    (e) at least one colorant or pigment.

20. The system of claim 18 having additionally incorporated therewith (c) tris-(3,5-di-t-butyl-4-hydroxybenzyl)cyanurate, (d) distearyl pentaerythritol diphosphite, and (e) a colorant.

* * * * *